United States Patent
Augst

(10) Patent No.: US 11,433,882 B2
(45) Date of Patent: Sep. 6, 2022

(54) METHOD AND DEVICE FOR PERFORMING AN AT LEAST PARTIALLY AUTOMATED DRIVING MANEUVER

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 921 days.

(21) Appl. No.: 16/223,784

(22) Filed: Dec. 18, 2018

(65) Prior Publication Data

US 2019/0118806 A1   Apr. 25, 2019

Related U.S. Application Data

(63) Continuation of application No. PCT/EP2017/068701, filed on Jul. 25, 2017.

(30) Foreign Application Priority Data

Jul. 29, 2016   (DE) .................... 10 2016 214 097.3

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B60W 30/09; B60W 10/18; B60W 10/20; B60W 30/0956; B60W 30/12;
(Continued)

(56) References Cited

U.S. PATENT DOCUMENTS 6,114,951 A   9/2000 Kinoshita et al.
10,115,310 B2   10/2018 Pflug
(Continued)

FOREIGN PATENT DOCUMENTS

CN   102627091 A   8/2012
CN   104054119 A   9/2014
(Continued)

OTHER PUBLICATIONS

International Search Report (PCT/ISA/210) issued in PCT Application No. PCT/EP2017/068701 dated Oct. 23, 2017 with English translation (six pages).

(Continued)

*Primary Examiner* — Jason Holloway
(74) *Attorney, Agent, or Firm* — Crowell & Moring LLP

(57) ABSTRACT

A method performs an at least partially automated maneuver. When an increased probability of collision of the vehicle with a vehicle in front is recognized, at least the decision to divert and/or the decision to return, i.e. the decision to return to the lane in which the vehicle was travelling before the diversion, is controlled as a function of a parameter of the traffic situation in front of the vehicle in front.

14 Claims, 2 Drawing Sheets

(51) Int. Cl.
    *B60W 10/20*     (2006.01)
    *B60W 30/095*    (2012.01)
    *B60W 30/18*     (2012.01)
    *B62D 15/02*     (2006.01)
    *B60W 30/16*     (2020.01)
    *G08G 1/16*      (2006.01)
    *B60W 30/12*     (2020.01)
    *B60W 50/00*     (2006.01)
    *B60K 31/00*     (2006.01)

(52) U.S. Cl.
    CPC ........ *B60W 30/0956* (2013.01); *B60W 30/12* (2013.01); *B60W 30/16* (2013.01); *B60W 30/18163* (2013.01); *B60W 50/0097* (2013.01); *B62D 15/025* (2013.01); *B62D 15/0265* (2013.01); *G08G 1/166* (2013.01); *G08G 1/167* (2013.01); *B60K 2031/005* (2013.01); *B60W 2554/80* (2020.02); *B60W 2554/801* (2020.02); *B60W 2710/18* (2013.01); *B60W 2710/20* (2013.01)

(58) Field of Classification Search
    CPC ........... B60W 30/16; B60W 30/18163; B60W 50/0097; B60W 2554/80; B60W 2554/801; B60W 2710/18; B60W 2710/20; B62D 15/025; B62D 15/0265; G08G 1/166; G08G 1/167; B60K 2031/005
    See application file for complete search history.

(56) References Cited

U.S. PATENT DOCUMENTS

| | | | |
|---|---|---|---|
| 2004/0090117 A1 | 5/2004 | Dudeck et al. | |
| 2012/0203418 A1* | 8/2012 | Braennstroem | B60W 30/09 701/23 |
| 2013/0054106 A1* | 2/2013 | Schmudderich | G06K 9/00805 701/96 |
| 2014/0358841 A1 | 12/2014 | Ono | |
| 2015/0025784 A1 | 1/2015 | Kastner et al. | |
| 2015/0073663 A1* | 3/2015 | Nilsson | B60W 50/0098 701/41 |
| 2015/0367854 A1 | 12/2015 | Ezoe et al. | |
| 2016/0059855 A1* | 3/2016 | Rebhan | B60W 30/095 701/41 |
| 2016/0075335 A1 | 3/2016 | Arndt et al. | |

FOREIGN PATENT DOCUMENTS

| | | |
|---|---|---|
| CN | 105216794 A | 1/2016 |
| CN | 105631217 A | 6/2016 |
| DE | 10 2008 047 499 A1 | 4/2010 |
| DE | 10 2012 005 245 A1 | 9/2012 |
| DE | 10 2013 217 430 A1 | 3/2014 |
| DE | 10 2013 214 233 A1 | 1/2015 |
| DE | 10 2013 216 931 A1 | 2/2015 |
| DE | 10 2013 217 436 A1 | 3/2015 |
| DE | 10 2014 002 116 A1 | 8/2015 |
| DE | 10 2014 218 565 A1 | 3/2016 |
| EP | 2 484 573 A1 | 8/2012 |
| EP | 2 990 290 A1 | 3/2016 |
| WO | WO 02/08010 A1 | 1/2002 |

OTHER PUBLICATIONS

German-language Written Opinion (PCT/ISA/237) issued in PCT Application No. PCT/EP2017/068701 dated Oct. 23, 2017 (six pages).

German-language Search Report issued in counterpart German Application No. 10 2016 214 097.3 dated Feb. 24, 2017 with partial English translation (12 pages).

Chinese-language Office Action issued in Chinese Application No. 201780038282.6 dated Jul. 13, 2021 with English translation (13 pages).

Chinese-language Office Action issued in Chinese Application No. 201780038282.6 dated Feb. 20, 2021 with English translation (13 pages).

\* cited by examiner

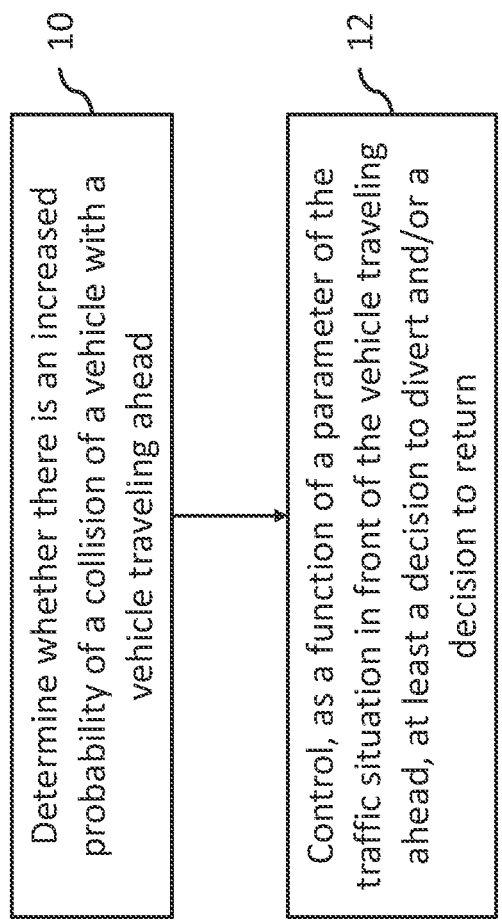

METHOD AND DEVICE FOR PERFORMING AN AT LEAST PARTIALLY AUTOMATED DRIVING MANEUVER

CROSS REFERENCE TO RELATED APPLICATIONS

This application is a continuation of PCT International Application No. PCT/EP2017/068701, filed Jul. 25, 2017, which claims priority under 35 U.S.C. § 119 from German Patent Application No. 10 2016 214 097.3, filed Jul. 29, 2016, the entire disclosures of which are herein expressly incorporated by reference.

BACKGROUND AND SUMMARY OF THE INVENTION

The present invention relates to a method for performing an at least partially automated driving maneuver, in particular for resolving a braking/diversion dilemma.

For example, diversion assistance by means of steering assistance if a vehicle traveling ahead brakes, is known from the prior art. In this context, assistance can also be provided for the vehicle in question to return to its own lane. Furthermore, a decision to divert based on the movement data of the vehicle in question and of the vehicle traveling ahead is also known.

In addition, it is known to take into account the vehicle traveling ahead in the case of longitudinal guidance of the vehicle (for example ACC) and to take into account the roadway markings in the case of transverse guidance operation of the vehicle (for example a lane guidance assistant or steering assistant).

It is the object of the invention to further improve a method for performing an at least partially automated maneuver, in particular for providing predictive diversion assistance of a vehicle.

The inventor has also recognized the following disadvantages in the prior art.

In the case of automatic resolution of the braking/diversion dilemma (decision between braking interventions or steering interventions when there is a threat of a collision in the frontal region) which is conceivable according to the prior art, for example the following cases are not taken into account:

if the vehicle traveling ahead had to brake owing to a critical situation with the vehicle in front of said vehicle, and/or if a critical situation has occurred between the vehicle in front of the vehicle in front and the vehicle in front of that vehicle or will occur in a more or less unavoidable fashion, resolution of the braking/diversion dilemma only on the basis of the probability of a collision with the vehicle in front does not bring about optimum safety in respect of a collision and can bring about unnecessary hazardous situations or limitations on the comfort of the vehicle and of adjacent road users.

The same applies in the case of a decision to assist the return of the vehicle into the lane in which it was earlier, e.g. after it traveled past a hazardous situation or in the case of aborting a diversion maneuver.

In such cases, the known diversion assistance is not optimum or can even be disadvantageous. In this context, the steering wheel interventions or steering torques can also be too early or too late for the return into the lane (the earlier one of the vehicle in question). In such situations, the diversion or the steering back assistance can be disadvantageous.

These disadvantages are not acceptable at the latest with a relatively high degree of automation, e.g. in the case of partially automated driving (TAF) or highly automated driving (HAF) or virtually fully automated driving (VAF) when responsibility for the driving of the vehicle is taken away from the driver to a greater extent.

The invention is therefore based on the intention that in a critical situation which becomes initially manifest as a risk of a tail-end collision with a vehicle in front, an intelligent decision to divert the vehicle in question and/or the decision to assist the driver during a diversion process is taken, which decision also automatically takes into account e.g. the reason for the braking of the vehicle in front. The traffic situation which the vehicle in question expects when it returns into its own lane is also to be estimated, and the decision to return as well as already the previously made decision to divert are made dependent on said traffic situation.

In order to evaluate this part of the traffic situation, it is possible to use, for example, the portion of the radar data which passes through under the vehicle in front and can supply information about one or more road users in front of the vehicle in front.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a flowchart illustrating a method according to an embodiment of the invention.

DETAILED DESCRIPTION OF THE DRAWINGS

Figure 1:
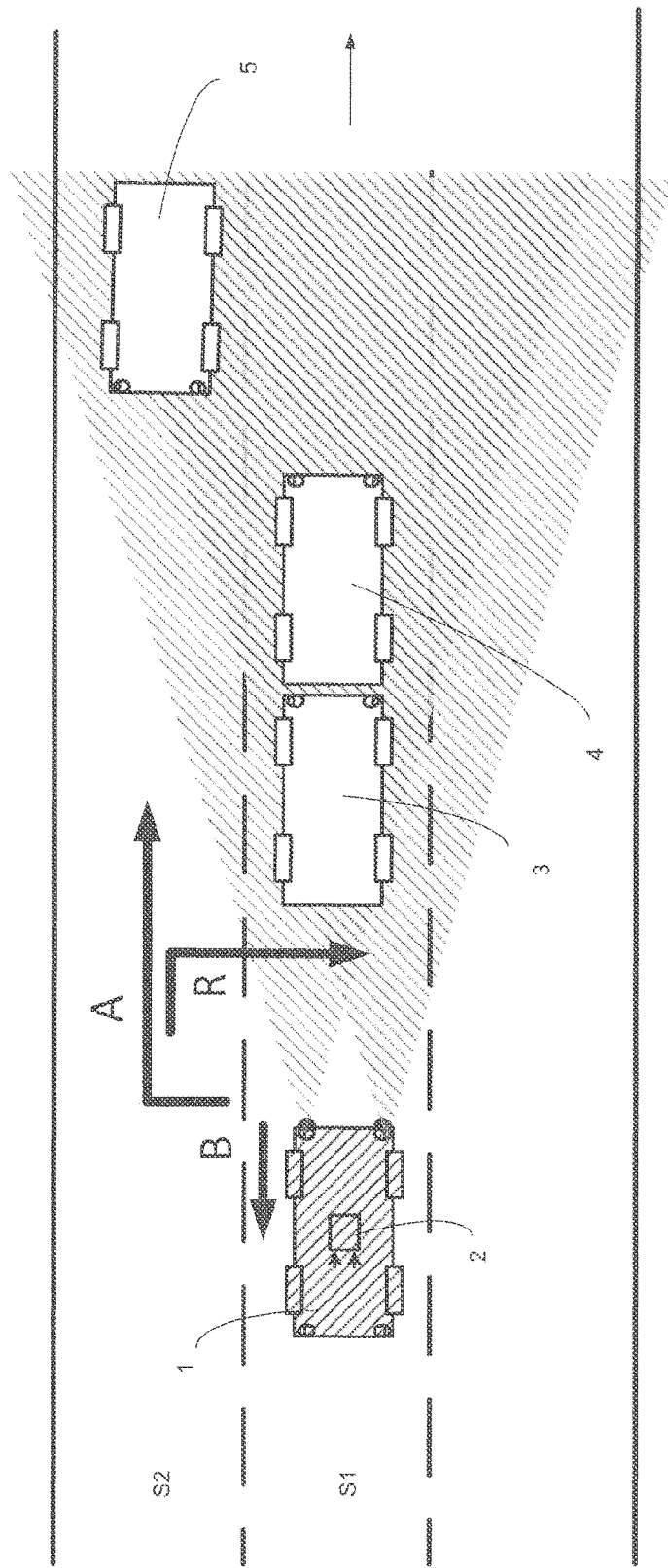
FIG. 1 is a schematic view of possible decision options depending on a possible traffic situation in front of the vehicle in front.

FIG. 1 illustrates a three-lane road with a lane S1 of the vehicle 1 in question and a possible diversion lane S2. The vehicle 1 in question is equipped with an electronic control unit 2 which is known per se and which contains a functional module (computer program) according to the invention which is configured (in particular programmed) in such a way that when an increased probability of a collision of the vehicle 1 in question with a vehicle 3 traveling ahead is detected, a decision for or against a diversion operation A and/or a braking operation B, and/or a return operation R (from the diversion lane S2 into the previously exited lane S1) is controlled as a function of the traffic situation in front of a vehicle 3 traveling ahead. In particular, other road users in front of the vehicle 3 traveling ahead are taken into account, such as, for example, a vehicle 4 ("vehicle in front of the vehicle in front") in front of the vehicle 3 which is traveling ahead or an oncoming vehicle 5 on the diversion lane S2.

The control unit 2 is for this purpose connected, in a way which is also known per se, to sensors or devices which supply sensor data and which are necessary for this purpose.

The control device according to the invention can have one or more described control units. For example, the functional module can be divided between a component which runs in an integration control unit for driver assistance systems and into a component which runs, for example, on a calculating unit of a radar system or camera system.

A number of examples of combined method steps will be explained below.

FIG. 2 is a flowchart illustrating a method according to an embodiment of the invention. As shown in FIG. 2, the method may begin at block 10 in which it is determined whether there is an increased probability of a collision of a vehicle with a vehicle traveling ahead. The method may continue at block 12 in which at least a decision to divert and/or a decision to return is controlled as a function of a parameter of the traffic situation in front of the vehicle traveling ahead.

Depending on what kind of situation has occurred for the vehicle in front of the vehicle in question, or what kind of situation will probably occur in the near future, a decision of the vehicle in question is made about:
(i) the resolution of the braking/diversion dilemma (diversion: yes/no, if appropriate time, location and parameter), AND/OR
(ii) the return into the vehicle in question's own lane (steering back: yes/no, if appropriate time, location or parameter).

In the method at least the variation of the decision about the braking and/or diversion as well as a control operation (in particular a situation-related adaptation or situation-related adaptive closed-loop control operation) is preferably implemented using the following criteria:
(i) the time of the transition between a maneuvering phase with a predominant effect of braking to a predominant effect of steering and/or
(ii) a decision time up to when the drive must confirm the maneuver so that it is assisted.

In addition, diversion parameters and/or return parameters can optionally also be open-loop (or preferably closed-loop) controlled, in particular, also as a function of the parameter of the traffic situation in front of the vehicle traveling ahead. In the method, at least one transverse guidance operation of the vehicle, in particular the transverse guidance operation portion of a driving maneuver, is particularly preferably controlled as a function of the at least one parameter of the traffic situation in front of the vehicle traveling ahead. In addition, a longitudinal guidance operation, in particular what is referred to as a longitudinal-transverse vehicle guidance operation, can also be controlled at the same time. In this context, suitable interaction of a longitudinal-transverse guidance operation can also be controlled.

It is also possible to decide between the following measures, in particular as a function of the situation in front of the vehicle traveling ahead hereinafter also referred to as 'the vehicle in front':
(i) an assisted steering maneuver, wherein a steering wheel intervention takes place only if it is determined that the driver unambiguously expresses his decision to divert;
(ii) a prevention operation (overridable) of a steering maneuver by the driver if it is determined that the diversion maneuver will cause a significant disadvantage for the vehicle or another road user with a certain degree of probability;
(iii) a driver motivation to carry out a (specific) steering maneuver (e.g. diversion or return), to assist said steering maneuver and/or to allow it to carry on in an automated fashion;
(iv) to carry out a diversion maneuver in an automated fashion (to a high degree) if it is determined that otherwise significantly higher risks would arise.

In the text which follows a number of more concrete exemplary embodiments are specified.

If it is determined that there is a high risk of a collision between a vehicle in front of the vehicle in front and the vehicle in front of that vehicle, the resolution of the braking/diversion dilemma is influenced in the direction of "braking"; i.e. for example, if it is at all possible, diversion is not carried out and hard braking is carried out instead because it is expected that the later return into the lane will potentially not be possible or will potentially be hazardous.

If it is determined that the vehicle in front brakes because of a critical situation in front of it, the probability that said vehicle will divert (in the manual or partially automated fashion) can then also be assumed; this is because the vehicle in front could, of course, also have a function available for partially automated diversion.

In addition it is taken into account whether the diversion lane is an oncoming lane and/or how probable it is that it is an oncoming lane.

It can also be taken into account how probable it is that a diversion possibility involves an oncoming lane and/or the probability with which an oncoming overtaking vehicle may approach in a diversion lane in a specific time interval in the near future.

In the method according to the invention for performing an at least partially automated maneuver, when an increased probability of a collision of the vehicle with a vehicle traveling ahead is detected, at least the decision to divert and/or decision to return (i.e. decision to return into the lane in which the vehicle was traveling on before the diversion operation), preferably also the decision to brake, is controlled as a function of a parameter of the traffic situation in front of the vehicle traveling ahead.

A decision to divert and/or decision to return can comprise here selecting a different (adjacent) lane as a target lane for trajectory planning and/or a lane guidance method (in particular a lane guidance closed-loop control operation).

A decision to return can comprise, for example, that the lane of the vehicle in question (which the vehicle was traveling in before the diversion process), is selected as a target lane for a lane guidance method. A decision to return can relate here to a return of the vehicle into its previous lane after the vehicle in front (i.e. after the vehicle in front or the traffic situation in front of the vehicle in front is sufficiently far behind or an at least partial return of the vehicle into its original lane in conjunction with aborting of a diversion maneuver.

A decision to divert and/or a decision to return can comprise here the information as to which specific lane of the roadway is selected as a current target lane for a closed-loop control system of the vehicle.

For example, in the method a target trajectory of the vehicle can be shifted into a specific adjacent lane as a function of a decision to divert and/or as a function of a decision to return. Shifting of the trajectory can occur here as a function of the lane markings which are detected using resources of the vehicle.

In this context, the decision to divert and/or the decision to return can comprise per se a "digital" portion of the decision. Alternatively or additionally, the decision to divert and/or decision to return can comprise an offset with respect to a lane marking line or with respect to a center of a lane. In this context, the target trajectory of the vehicle can also be moved, depending on the decision to divert and/or the decision to return, into a specific position which is offset in comparison with a center of a lane.

The decision to divert and/or the decision to return can also represent a time and/or a (relative) position information item which is characteristic of another lane or of a specific offset in relation to a lane being reached.

The at least partial performance of the maneuver is preferably carried out as a function of parameters of the traffic situation in front of the vehicle traveling ahead, e.g. a so-called TTC (=Time To Collision) between at least two other vehicles which do not directly affect the vehicle itself.

In this context, one or more parameters of the traffic situation in front of the vehicle traveling ahead are evaluated and considered. In the method, a detected parameter of the traffic situation, several times in succession, e.g. cyclically or in an event-controlled fashion, preferably in a real-time-enabled fashion, can particularly preferably be taken into account. In this context, a change, in particular a chronological and/or spatial gradient of a parameter, can also be considered to be a parameter.

For example, a parameter representing an increase in a risk of a collision between at least two road users in front of the vehicle in question, which road users are not themselves the vehicle in question, can also be considered to be a parameter of the traffic situation in front of the vehicle traveling ahead.

According to this description, the vehicle traveling ahead or the vehicle in front is to be understood as the vehicle which is traveling in front of the vehicle at a distance (1 to 50 meters or 1 to 100 meters) which is relevant for the manual or at least partially automated guidance of the vehicle, in particular on the lane of the vehicle. The meaningfulness of this feature is also explained by the fact that the vehicle traveling ahead and, if appropriate, a vehicle traveling ahead of it can be detected in the method by means of a sensor of the vehicle. Accordingly, the traffic situation in front of the vehicle which was the vehicle traveling ahead at the start of the diversion maneuver and/or steering back maneuver is in this context, the traffic situation in front of the vehicle traveling ahead.

In addition, at least one parameter of the traffic situation in front of the vehicle traveling ahead can also be determined in the method as a function of a road profile and/or lane profile of the roadway in the current section of roadway. For example, a transverse guidance operation of at least one vehicle in front of the vehicle traveling ahead or a conclusion about the traffic situation in front of the vehicle traveling ahead, which results therefrom, is determined as a function of a road profile and/or lane profile of the roadway in which the road users are located. Information about the road profile and/or lane profile of the roadway in a respective section of roadway can be determined here e.g. from a position information item of the vehicle and a digital map.

In a simple case, such parameters can be parameters of relative movement between road users in front of the vehicle in front in the forward direction and/or probabilities of a collision and/or consequences of a possible, probable or unavoidable collision.

In addition, a parameter which represents a lane guidance operation of a road user in front of the vehicle traveling ahead, for example an offset relative to a lane line, which exceeds a predetermined value or fluctuates, can be taken into account. A transverse offset which exceeds a previously determined value or fluctuates, between at least one vehicle in front of the vehicle traveling ahead with respect to another vehicle, e.g. the vehicle traveling ahead, can be taken into account.

At least one parameter of the traffic situation in front of the vehicle traveling ahead preferably relates to a condition which to the driver of the vehicle, e.g. from the point of view of the driver, is not discernible, for example is concealed by at least one other vehicle.

The parameters particularly preferably relate to the profile of the lane of the vehicle in question and comprise the vehicle in front and road users located in front of the vehicle in front on the lane or in the direction (of the vehicle in question). Alternatively or additionally, the traffic situation on at least one adjacent lane or intersecting or leading-in lanes or roads can also be taken into account.

The resolution of the braking/diversion dilemma can also be implemented as a function of the traffic situation in front of the vehicle traveling ahead. In this context it is possible for the decision to be influenced both between diversion and/or braking. The diversion parameters can comprise the time, location and/or travel path planning parameters.

The decision to return can comprise the decision "return: yes/no". Return parameters can comprise the time, location and/or travel path planning parameters. In particular, in this context the transverse guidance operation of the vehicle can be open-loop or closed-loop controlled as a function of a parameter of the traffic situation in front of the vehicle traveling ahead.

In this context at least the transverse guidance operation of the vehicle is particularly preferably closed-loop, in particular closed-loop controlled during the performance of the diversion maneuver and/or the steering back maneuver as a function of a parameter of the traffic situation in front of the vehicle traveling ahead.

For example, even if it has been determined before the start of a diversion maneuver and/or before the presence of an increased probability of a collision with the vehicle traveling ahead, that at least one vehicle in front of the vehicle traveling ahead had relatively large deviations with respect to its transverse guidance operation, in particular its lane guidance (e.g. within a time interval of greater than 5-30 seconds), a parameter of a diversion maneuver (resulting only at a later time, in particular in response thereto) can be adapted with respect to the vehicle traveling ahead. For example, in this context the decision to divert and/or the decision to return or the time of the transition between a braking phase and a steering phase when a probability of a collision is present or a probability of a collision will follow in the near future, can be varied with the vehicle traveling ahead.

In the method, a functional logic of a vehicle function, in particular of a driver assistance function, can also be varied, in particular adapted, as a function of a parameter of the traffic situation in front of the vehicle traveling ahead. The adaptation can also be carried out according to other previously determined criteria, for example an increase in the safety, minimization of uncomfortable transverse accelerations, a better driving style, e.g. consideration of other road users. For example, even before the start of or in an initial phase of a specific, at least partially automated maneuver, a functional logic which is to be applied for the coming maneuver (at least expected maneuver) can be determined in advance. In particular, it is also possible to adapt a functional logic which relates to measurement variables or events which have not yet occurred.

The functional logic can include here the reactions of the vehicle function to specific (under certain circumstances not yet present) traffic situations, events or measurement variables which can arise in the course of the maneuver. The functional logic can also comprise, for example, a series of specific functional interventions and/or driver information items as a function of the specific (associated) value thresholds or warning thresholds. The functional logic can relate, for example, to the criteria of a target object selection, wherein the target object can be an object for carrying out a closed-loop control operation, e.g. a follow-on closed-loop operation.

The functional logic of a vehicle function can be adapted in relation to a maneuver or for a corresponding time interval as a function of a traffic situation in front of the vehicle traveling ahead, wherein the functional logic can also relate to a plurality of (other) objects which can differ from the vehicle traveling ahead or from the road user in front of the vehicle traveling ahead.

In specific cases, in the method it is also possible to carry out a control operation of the longitudinal dynamics of the vehicle in conjunction with at least partially automated diversion maneuvers and/or lane changing maneuvers. In particular the assistance or execution or adaptation of an emergency braking operation or targeted braking operation with respect to a moving target is also part of the scope of the invention. An at least partially automated maneuver can be in this invention, in particular, an emergency diversion maneuver. This can be carried out, in particular, as a function of further criteria for emergency maneuvers.

At least one parameter from the following parameters of the traffic situation in front of the vehicle traveling ahead is preferably taken into account:
(i) a parameter of a (probable) collision or disruption between a vehicle in front and a vehicle in front of the vehicle in front and/or
(ii) a parameter of a (probable) collision or disruption between a vehicle in front and another road user and/or
(iii) a parameter of a (probable) collision or disruption between a vehicle in front of the vehicle in front and another road user and/or
(iv) pulling out and/or a driving intention, in particular relating to a transverse guidance operation of the at least one road user in front of the vehicle in front.

In this context, the following parameters of the collision can be taken into account:
(i) the time and/or location of the collision, in particular TTC=Time To Collision
(ii) probability of a collision
(iii) at least two probability values for one or more variants of one or more collisions or disruptions
(iv) a further movement of at least one collision partner after a (probable) collision.

The "other road user" can be a vehicle in front of the vehicle in front of the vehicle in front, in the form of a vehicle.

In addition, the other road user can also be a pedestrian who is located within the lane (of the vehicle in question), in a previously calculated trajectory of the vehicle in front and/or in the direction of the lane of the previously calculated trajectory. In this context, the movement intention which the pedestrian could have is preferably determined.

The term "parameter of a collision" is also to be understood as meaning the consideration of a disruption or a probability of a disruption. A disruption within the scope of this description is to be understood as being an, in particular local, serious disruption of the traffic flow, which can be caused, for example, by specific road users traveling too close one behind the other. A severe disruption means, for example, a disruption which can result in relatively abrupt braking of a directly or indirectly affected road user.

In one development of the invention, one or more parameters of the at least partially automated diversion and/or return into the lane are closed-loop controlled before the diversion as a function of the parameters of the traffic situation in front of the vehicle traveling ahead.

Quantitative and/or chronological changes in the parameters of the traffic situation during the diversion and/or steering back can also be taken into account. In this context, the chronological profile of a steering torque and/or of a steering angle are/is particularly preferably closed-loop controlled. In this context, corresponding closed-loop control of the parameters for the diversion and/or return times, return travel path curves and return locations is carried out, wherein transverse-dynamic parameters which also change during the traffic situation are also taken into account.

In this context, the method can also generally comprise adaptation and/or weighting of various (closed-loop control) criteria as a function of the traffic situation in front of the vehicle traveling ahead.

In the method, at least one parameter of the transverse guidance operation of the vehicle is preferably controlled during the performance of a diversion maneuver and/or of a steering back maneuver. In this context, a control operation, in particular adaptation of a parameter of the transverse guidance operation of the vehicle, can be carried out at least twice, in particular multiple times, within the course of the one diversion maneuver and/or of the one steering back maneuver.

In an additional development of the invention, at least one time relating to resolution of a braking/diversion dilemma, preferably at least the time of the start of a braking phase or the diversion phase and/or a transition time between a maneuvering phase with a predominant braking effect and a maneuvering phase with a predominant steering effect is closed-loop controlled as a function of the parameters of the traffic situation in front of the vehicle traveling ahead.

The predominant braking effect or steering effect can be defined here in each case according to the distribution of the frictional force between the vehicle tires and the roadway (cf. Circle of Forces).

At least one parameter of a possible collision or disruption between the vehicle in question and the vehicle in front is preferably determined as a function of one or more relative movement parameters or a collision between the vehicle in front and a further road user.

This parameter also relates directly to the vehicle in question. As a function thereof it is possible to determine the presence or imminence of a braking/diversion dilemma. Alternatively or additionally, at least one diversion parameter or steering back parameter can be appropriately controlled as a function of this parameter. A further execution of the method can preferably be carried out as a function of this parameter. The disruption may also be a (probable) collision here.

Furthermore, the probability with which a collision or disruption can occur within a specific time interval in the diversion lane is also preferably taken into account.

The probability of a collision or disruption relates, in particular, to an oncoming road user. This can be the case when the (possible) diversion lane is an oncoming lane or when another road user overtakes (from a "next-but-one lane").

In particular, one or more parameters are determined with respect to at least one specific diversion lane or two alternative diversion lanes. The braking/diversion dilemma is then solved (in an optimized fashion) and/or the decision to divert is made between two alternative lanes.

A decision to divert can preferably be made in such a way that a subsequent (possible) return to the lane in question of the vehicle is taken into account. Specific advantages or disadvantages of the subsequent possible return (resulting from a diversion process onto a specific lane) into the lane in question can be assessed.

In the method it is possible to take into account that in specific situations on multi-lane, structurally separate roads, the return into the lane in question is not necessary or can be disadvantageous, in particular if it is known that a collision has occurred or will occur in front of the vehicle in front. For example, in the method it is possible to provide that a return into the lane in question is (actively) suppressed in such cases, for example for specific time intervals or sections of road.

Furthermore, a probability of diversion of the vehicle in front onto another lane, in particular onto the diversion lane of the vehicle in question, can be taken into account. In this context, the probability of diversion can be determined as a function of the relative movement between the vehicle in question and the vehicle in front and/or between the vehicle in front and a further road user. Additionally or alternatively, the position and/or orientation of the vehicle in front relative to the lane profile and/or signaling of the front vehicle to the outside (flashing indicating lights/flashing warning lights) can be determined.

In a further refinement of the invention, when an increased risk of collision of the vehicle in question with the vehicle in front is present, the probability of diversion of the vehicle in front onto another lane is preferably determined, wherein assistance or execution of a targeted braking operation of the vehicle with respect to the vehicle in front is implemented if the probability of diversion of the vehicle in front onto the diversion lane of the vehicle in question is lower than a predetermined value, or assistance or execution of a targeted braking operation of the vehicle with respect to the vehicle in front of the vehicle in front is executed if the probability of diversion of the vehicle in front onto the diversion lane of the vehicle in question is higher than a predetermined value.

For example, in the method it is also possible to decide to carry out a targeted braking operation with respect to a road user in front of the vehicle traveling ahead if it is detected that the vehicle traveling ahead is performing a diversion maneuver (onto an adjacent lane or in a specific direction).

In this context, the probability of diversion can in turn be determined as a function of the relative movement between the vehicle in question and the vehicle in front and/or between the vehicle in front and another road user. Additionally or alternatively, the position and/or orientation of the vehicle in front relative to the lane profile and/or signaling of the vehicle in front to the outside (flashing indicator lights/flashing warning lights) can be determined. This is in turn dependent on the probability of a collision of the vehicle in front with one or more road users on the target lane thereof.

Specific decision variants and/or parameters of the resolution of the braking/diversion dilemma can be selected as a function of a pattern of the parameters of the traffic situation in front of the vehicle traveling ahead. In particular, this can be a pattern of the change in the parameters of the traffic situation. The term "pattern" is to be understood as meaning, in particular, a combination or sequence of the respective parameters, e.g. as parameter value ranges.

The method can comprise the execution or a configuration, in particular a predictive configuration, of an at least partially automated maneuver, wherein the maneuver is initiated or carried out in an at least partially automated fashion already before an increased probability of a collision of the vehicle with the vehicle traveling ahead of it occurs. At least one parameter of the traffic situation in front of the vehicle traveling ahead can be determined as a function of a device outside the vehicle. Parameters of the traffic situation can be relative movement parameters between road users starting from the vehicle in front in the forward direction and/or probability of a collision and/or consequences of a possible, probable or unavoidable collision.

At least one parameter of the traffic situation in front of the vehicle traveling ahead can preferably be determined as a function of radar waves which are emitted by the radar of the vehicle, passed through under the vehicle traveling ahead and after reflection are in turn received by one or more road users in front of the vehicle traveling ahead, and are evaluated by the radar of the vehicle. In this context, in the method it is possible to decide, e.g. by means of specially configured methods (e.g. based on digital filters), that these radar waves characterize one or more of the road users in front of the vehicle traveling ahead. In addition, a relative position and/or a relative speed can be determined, e.g. as a function of the data representing this part of the radar waves, and a parameter of the traffic situation in front of the vehicle traveling ahead can be determined therefrom.

For example, an offset of the wheels of at least one road user in relation to another road user, in particular in the transverse direction (in the direction essentially perpendicular to the direction of travel) can also be determined and taken into account as a parameter.

Alternatively or additionally, a parameter of the traffic situation in front of the vehicle traveling in front, in particular relating to at least one road user which is traveling directly in front of the vehicle traveling in front can be determined by means of so-called car-2-car, car-2-infrastructure, back end or at least one sensor outside the vehicle, for example on a freeway bridge, a class (object class), a speed value and/or the sequence of the road users. The probability or the consequences of a collision in front of the vehicle can be determined (at the same time) therefrom or the relative movement parameters or collision parameters which are detected using resources of the vehicle can be confirmed, corrected or rejected.

As a function of a parameter of the traffic situation in front of the vehicle traveling ahead, a decision is preferably made between:
(i) an assisting transverse guidance operation of the vehicle for the purpose of diversion, wherein a steering wheel intervention is carried out only if it is determined that the driver unambiguously expresses his decision to divert,
(ii) an (overridable) hindrance of a diversion process by the driver at least in a specific direction if it is determined that the diversion has a certain probability of causing a significant disadvantage for the vehicle or for another road user,
(iii) a driver motivation, in particular in the form of a haptic or kinesthetic information item, to the effect of performing and/or assisting a diversion maneuver and/or of allowing it to carry on in an automated fashion if it is determined that a diversion offers a significant advantage over braking,
(iv) a diversion maneuver which is carried out in an automated fashion (to a high degree) if it is determined that otherwise significantly higher risks would arise.

For example, the decision between at least two such measures which essentially serve the same purpose can be influenced as a function of the traffic situation, evaluated in the method, in front of the vehicle traveling ahead.

It is also possible to decide (explicitly) not to carry out specific measures or measures of a specific type, as a function of the traffic situation in front of the vehicle traveling ahead, in particular to suppress said measures for several seconds, cancel them or shift their timing. In particular, in the method it is possible to decide, as a function of the traffic situation in front of the vehicle traveling ahead:
(i) not to perform an assisted steering maneuver even if it is determined that the driver unambiguously expresses his decision to divert;
(ii) not to permit prevention of a steering maneuver by the driver if it is determined that there is a certain probability that the diversion maneuver will cause a significant disadvantage for the vehicle or for another road user; and
(iii) not to perform a diversion maneuver in an automated fashion (to a high degree) if it is determined that otherwise significantly higher risks would arise owing to the traffic situation in front of the vehicle traveling ahead.

In this context, different decision options for the diversion and for the steering back are implemented as a function of at least one parameter of the traffic situation in front of the vehicle traveling ahead.

The decision options and/or parameters for a diversion and the decision options and/or parameters for a return into a lane are preferably different as a function of the traffic situation.

In one preferred exemplary embodiment, at least one parameter of the traffic situation in front of the vehicle traveling ahead is determined as a function of a received echo of the radio waves which have been emitted by the vehicle radar, have passed under the vehicle traveling ahead and have been reflected by at least one other road user (in front of the vehicle in front).

A parameter of the longitudinal guidance operation and/or transverse guidance operation of a road user in front of the vehicle traveling ahead can particularly preferably be determined as a function of such an echo and taken into account as a parameter of the traffic situation in front of the vehicle traveling ahead. In this context, e.g. pulling out and/or a driving intention of at least one road user in front of the vehicle traveling ahead can also be determined and taken into account for the near future.

Alternatively or additionally, the parameter of the traffic situation in front of the vehicle traveling ahead can also be determined using other resources, e.g. by way of a wireless connection; e.g. by the following method steps:
(a) the vehicle in front transmits directly or indirectly a parameter relating to the traffic situation in front of it to the vehicle in question, in particular relating to objects which it itself conceals from the perspective of the vehicle in question or the sensor system thereof,
(b) the position parameters, e.g. local or global coordinates of the vehicle in front and at least of one object (vehicle in front of the vehicle in front) which is located in front of the vehicle in front are subsequently compared.

At least part of the method, preferably the determination of a parameter of the traffic situation in front of the vehicle traveling ahead, can be carried out using resources of a mobile user device (of the driver) which can be carried along in the vehicle and is configured, in particular, for this purpose.

The invention also comprises a computer program, in particular a computer program product comprising a computer program, wherein the computer program is designed to execute, on a data-processing device of the vehicle or of the mobile user device, a part of the method according to the invention or an advantageous configuration of the method according to one or more further features of the method during its execution. In particular, the computer program is a software program which can run, for example, as an App (="Application") on a control device which is installed or can be carried along in the vehicle. Part of the control device can be a mobile user device here.

The computer program comprises an executable program which, during its execution by a data-processing device, executes at least part of the method according to the first aspect or an advantageous configuration of the method.

The computer program product can be embodied as an update of a previous computer program which comprises, for example within the scope of a functional expansion, for example within the scope of a so-called remote software update, the parts of the computer program or of the corresponding program code for a corresponding control device of the vehicle.

If a vehicle is mentioned here, this is in this context preferably a multi-track vehicle (passenger car, truck, transporter) or a motorcycle. This results in multiple advantages which are described explicitly within the scope of this document and multiple further advantages which can be discerned by a person skilled in the art.

A particularly large advantage arises during the application on a vehicle which travels in an at least partially automated fashion. Alternatively, the vehicle can be an aircraft or a watercraft, wherein the method is correspondingly applied to aircraft or watercraft. In this case, in particular virtual flight corridors or travel corridors for watercraft apply as travel lanes. In the case of an aircraft, the method can be applied in a three-dimensional fashion and/or with respect to three-dimensional travel lanes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for performing an at least partially automated maneuver via an electronic control unit for a vehicle, the method comprising the steps of:
   detecting whether there is an increased probability of a collision of the vehicle with a vehicle traveling ahead, and
   controlling, as a function of a parameter of the traffic situation in front of the vehicle traveling ahead, at least a decision to divert and/or a decision to return, wherein:
   when an increased risk of a collision of the vehicle with the vehicle traveling ahead is present, a probability of diversion of the vehicle traveling ahead onto another lane is determined,
   assistance or execution of a targeted braking operation of the vehicle with respect to the vehicle traveling ahead is implemented if the probability of diversion of the vehicle traveling ahead onto a diversion lane of the vehicle is lower than a predetermined value, and
   assistance or execution of a targeted braking operation of the vehicle with respect to a vehicle in front of the vehicle traveling ahead is executed if the probability of diversion of the vehicle traveling ahead onto the diversion lane of the vehicle is higher than a predetermined value.

2. The method as claimed in claim 1, wherein
   a transition to a maneuvering phase with a predominant braking effect or to a maneuvering phase with a predominant steering effect is controlled as a function of the parameters of the traffic situation in front of the vehicle traveling ahead.

3. The method as claimed in claim 1, wherein
at least a time of a start of a braking phase or a diversion phase and/or a transition time between a maneuvering phase with a predominant braking effect and a maneuvering phase with a predominant steering effect are/is controlled as a function of the parameters of the traffic situation in front of the vehicle traveling ahead.

4. The method as claimed in claim 1, wherein
one or more parameters from the following group of parameters of the traffic situation in front of the vehicle traveling ahead is taken into account:
(i) a parameter of a probable collision or disruption between the vehicle traveling ahead and a vehicle in front of the vehicle traveling ahead,
(ii) a parameter of a probable collision or disruption between the vehicle traveling ahead and another road user,
(iii) a parameter of a probable collision or disruption between the vehicle in front of the vehicle traveling ahead and another road user, and
(iv) pulling out and/or a driving intention of at least one road user in front of the vehicle traveling ahead.

5. The method as claimed in claim 1, wherein
at least one parameter of a possible collision or disruption between the vehicle and the vehicle traveling ahead is determined as a function of one or more relative movement parameters or a collision between the vehicle traveling ahead and another road user.

6. The method as claimed in claim 1, wherein
a probability with which a collision or disruption can occur in the diversion lane within a specific time interval is taken into account in order to make a decision against a diversion control operation and/or a return control operation.

7. The method as claimed in claim 1, wherein
different decision criteria for the diversion and for the return are taken into account as a function of at least one parameter of the traffic situation in front of the vehicle traveling ahead.

8. A control device for performing an at least partially automated maneuver for a motor vehicle, comprising:
an open-loop or closed-loop electronic control unit that executes a computer program to:
detect whether there is an increased probability of a collision of the vehicle with a vehicle traveling ahead, and
control, as a function of a parameter of the traffic situation in front of the vehicle traveling ahead, at least a decision to divert and/or a decision to return, wherein:
when an increased risk of a collision of the vehicle with the vehicle traveling ahead is present, a probability of diversion of the vehicle traveling ahead onto another lane is determined,
assistance or execution of a targeted braking operation of the vehicle with respect to the vehicle traveling ahead is implemented if the probability of diversion of the vehicle traveling ahead onto a diversion lane of the vehicle is lower than a predetermined value, and
assistance or execution of a targeted braking operation of the vehicle with respect to a vehicle in front of the vehicle traveling ahead is executed if the probability of diversion of the vehicle traveling ahead onto the diversion lane of the vehicle is higher than a predetermined value.

9. The control device as claimed in claim 8, wherein
a transition to a maneuvering phase with a predominant braking effect or to a maneuvering phase with a predominant steering effect is controlled as a function of the parameters of the traffic situation in front of the vehicle traveling ahead.

10. The control device as claimed in claim 8, wherein
at least a time of a start of a braking phase or a diversion phase and/or a transition time between a maneuvering phase with a predominant braking effect and a maneuvering phase with a predominant steering effect are/is controlled as a function of the parameters of the traffic situation in front of the vehicle traveling ahead.

11. The control device as claimed in claim 8, wherein
one or more parameters from the following group of parameters of the traffic situation in front of the vehicle traveling ahead is taken into account:
(i) a parameter of a probable collision or disruption between the vehicle traveling ahead and a vehicle in front of the vehicle traveling ahead,
(ii) a parameter of a probable collision or disruption between the vehicle traveling ahead and another road user,
(iii) a parameter of a probable collision or disruption between the vehicle in front of the vehicle traveling ahead and another road user, and
(iv) pulling out and/or a driving intention of at least one road user in front of the vehicle traveling ahead.

12. The control device as claimed in claim 8, wherein
at least one parameter of a possible collision or disruption between the vehicle and the vehicle traveling ahead is determined as a function of one or more relative movement parameters or a collision between the vehicle traveling ahead and another road user.

13. The control device as claimed in claim 8, wherein
a probability with which a collision or disruption can occur in the diversion lane within a specific time interval is taken into account in order to make a decision against a diversion control operation and/or a return control operation.

14. The control device as claimed in claim 8, wherein
different decision criteria for the diversion and for the return are taken into account as a function of at least one parameter of the traffic situation in front of the vehicle traveling ahead.

* * * * *